Aug. 30, 1955  K. H. GRAVES  2,716,507
LIQUID DISPENSERS
Filed Sept. 5, 1951  2 Sheets-Sheet 1

Inventor
Kendal Henry Graves
By
Pennie, Edmonds, Morton, Barrows & Taylor
Attorneys

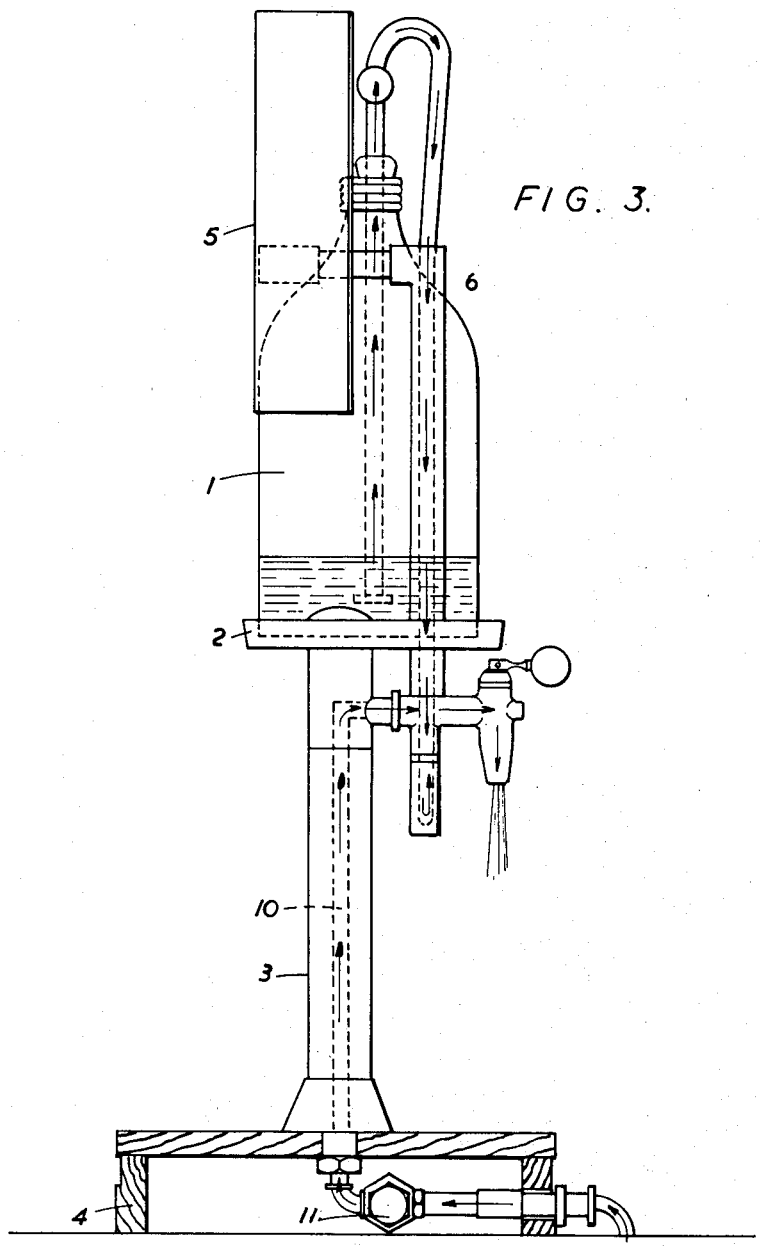

United States Patent Office 2,716,507
Patented Aug. 30, 1955

2,716,507

LIQUID DISPENSERS

Kendal Henry Graves, London, England, assignor to W. H. Heath Limited, London, England, a British company Application September 5, 1951, Serial No. 245,153

Claims priority, application Great Britain September 7, 1950

2 Claims. (Cl. 222—129.2)

The subject of this invention is a dispensing device for use in "milk bars," "soda fountains" and the like and has for its object to provide a dispensing device by which fruit essence or the like may be mixed with water, soda water or other liquid under pressure and dispensed in the desired proportions.

In the usual type of dispensing devices for such purposes a measured quantity of the fruit essence or the like is supplied to the drinking vessel by a pump beneath the counter or from a vessel above the counter from which vessel the essence can flow by gravity into the drinking vessel when a tap or cock is opened, while water or other liquid to be mixed with the essence is supplied from a separate tap.

The dispensing device of the present invention includes a mixing chamber having an inlet passage for the water or other liquid under pressure, an inlet passage for the fruit essence or the like and a delivery outlet for the mixed liquids fitted with a control valve, the inlet passages for the two liquids being disposed suitably at right angles to each other and so arranged that, when the outlet valve is opened, the stream of water or the like under pressure induces a flow of fruit essence or the like into the chamber to be mixed with the water and passed through the delivery outlet.

The relative proportions of fruit essence or the like and water to be dispensed is regulated either by the velocity of flow of the water across the exit of the inlet passage for the fruit essence, which may be controlled by a reducing valve, or is regulated by the alteration of the size or position of a "jet" in the said inlet passage.

If desired, the mixing chamber may be shaped to form a venturi tube into which the passage for the fruit juice or the like extends.

In order to prevent water under pressure from passing into the fruit essence container, the inlet for the fruit essence is provided with a ball or other valve located on a seat from which it is raised, permitting the supply of fruit essence, by the suction action created by the flow of water past the inlet passage, the valve returning to its seat on interruption of the flow of water.

The invention is illustrated in the accompanying drawings in which:

Fig. 2 illustrates a preferred form of the mixing device, while

Fig. 3 shows schematically, the apparatus in elevation.

Figure 1:
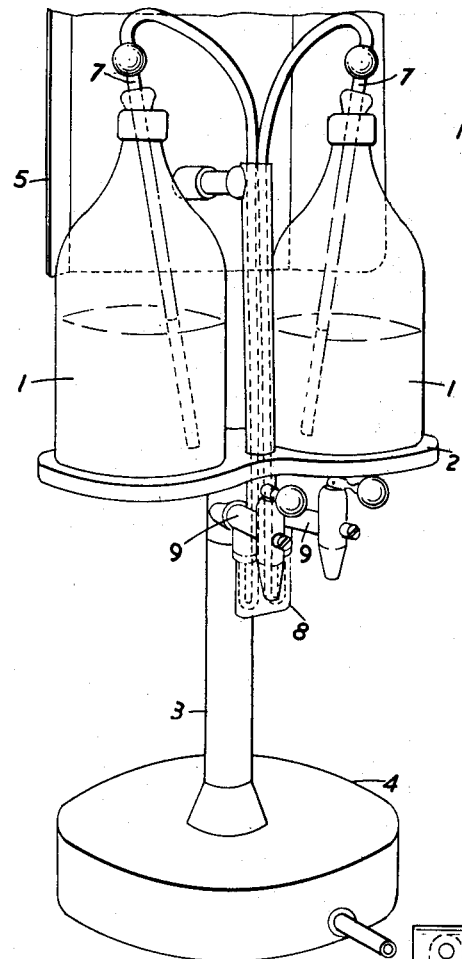
Fig. 1 illustrates in perspective view from the rear a construction of dispensing apparatus adapted to stand on a counter and providing for alternative sources of supply of fruit essence.

In the form shown, the dispensing apparatus includes two fruit essence containers or bottles 1, carried by a tray 2 mounted on a tubular column 3, supported on a base 4. 5 indicates a protecting plate for the containers which is carried by a tubular support 6. The protecting plate 5 may be used to advertise the drinks available.

Figure 2:
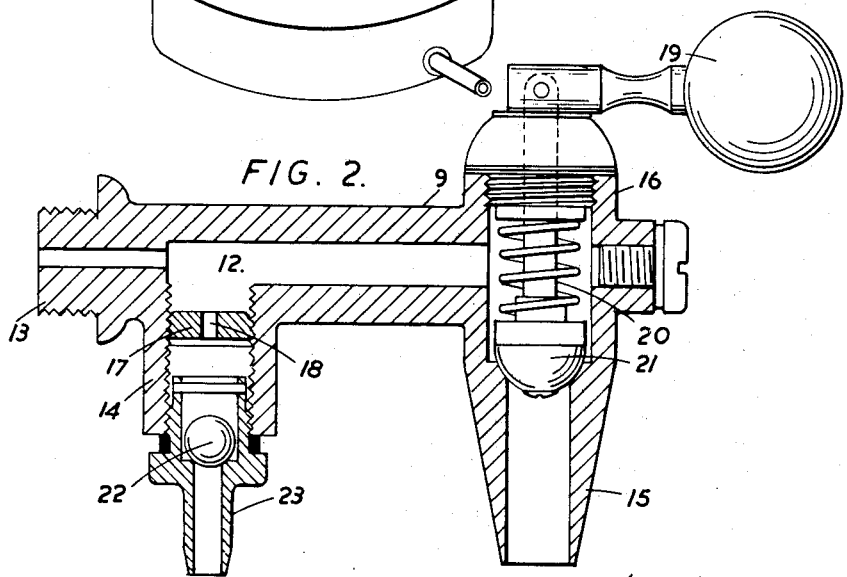

Within each container 1, extends a tube 7, suitably of plastic, the tubes passing from the containers down through the tubular support 6 being bent upwards within a casing 8 protecting the bends and being connected to the respective mixing vessels 9 which are mounted on the column 3 at an angle to one another and one of which is shown in Fig. 2. These mixing vessels are supplied with water under pressure from a water supply pipe 10 extending up within the column 3. In this supply pipe is suitably provided a reducing valve 11 by which to adjust the water pressure from the main.

Each mixing device 9 consists of a tube 12 having a branch 13 connected to the supply pipe 10 and a branch 14 at right angles thereto connected with the fruit essence supply pipe 7 and an outlet 15 controlled by a tap 16. Within the branch 14 is disposed a washer 17 provided with an opening 18 and screw threaded in the branch. This washer acts as a "jet" to control the flow of fruit essence. The "jet" may be interchangeable with another having a different size of opening and/or its position may be adjusted in the branch.

When the water flows through the mixing chamber connected with a particular container on opening the tap 16, a flow of fruit essence is induced from that essence container which is connected therewith and the mixture produced is delivered through the tap outlet 15.

The tap is preferably of the type shown in which the handle 19 is connected to a valve stem 20 projecting through the casing so that when the handle 19 is moved into the vertical position the valve stem 20 is raised and the valve 21 is raised from its seat allowing the flow of water.

To ensure that the water will not flow back into the fruit essence container a ball valve 22 is disposed in a nipple 23 screw threaded into the inlet branch 14. Due to the suction action of the water flowing through the chamber the valve 22 is raised from its seat allowing the fruit essence to flow but falls back on its seat immediately the tap outlet 15 is closed.

I claim:

1. In an apparatus for mixing liquids such as water and fruit essence in desired proportions and for dispensing the resulting mixture comprising a base, a tubular column mounted on the base, means providing a tubular laterally-extending mixing chamber mounted on said column, said chamber having an inlet end toward the column and a mixture-delivery end away from the column, a pipe for supplying water under pressure to the inlet end of the tubular mixing chamber, said pipe extending through said base and column and connected into the inlet end of the tubular mixing chamber, a valve in said pipe for adjusting the pressure of the water supplied therethrough to the chamber, a mixture delivery valve at the delivery end of said mixing chamber, a fruit essence inlet connection opening into the lower portion of the mixing chamber at its inlet end, a tray supported by said column above the mixing chamber, a fruit essence bottle supported on said tray, a tube for the delivery of fruit essence from the bottle to the essence inlet connection, one end of said tube extending into the fruit essence in the bottle and the other end being connected to said inlet connection, the arrangement being such that when the delivery valve is opened and the pressure in the mixing chamber relieved water under pressure flows from the water pipe across the outlet of the essence inlet connection at the inlet end of the mixing chamber and induces a flow of fruit essence into the mixing chamber where it is mixed with the incoming water from said pipe, and a non-return valve in the fruit essence inlet connection for preventing the flow of mixture from the mixing chamber into the fruit essence delivery tube and bottle when the mixture delivery valve is closed and pressure builds up in the mixing chamber.

2. In an apparatus for mixing liquids such as water and fruit essence in desired proportions and for dispensing the resulting mixture comprising a base, a tubular column mounted on the base, means providing a tubular laterally-extending mixing chamber mounted on said column, said chamber having an inlet end toward the column and a mixture-delivery end away from the column, a pipe for supplying water under pressure to the inlet end of the tubular mixing chamber, said pipe extending through said base and column and connected into the inlet end of the tubular mixing chamber, a valve in said pipe for adjusting the pressure of the water supplied therethrough to the chamber, a mixture delivery valve at the delivery end of said mixing chamber, a fruit essence inlet connection outside the column opening into the mixing chamber at its inlet end and arranged at an angle to the pipe connection to the mixing chamber, a tray supported by said column above the mixing chamber, a fruit essence container supported on said tray, a tube for delivering fruit essence from the container to the fruit essence inlet connection to the mixing chamber, one end of said tube being connected into the fruit essence container and the other end being connected to said inlet connection, the arrangement being such that when the delivery valve is opened and the pressure in the mixing chamber relieved water under pressure flows from the water pipe across the outlet of the essence inlet connection at the inlet end of the mixing chamber and induces a flow of fruit essence from the fruit essence container into the mixing chamber where it is mixed with the incoming water delivered under pressure from said pipe, and a non-return valve in the fruit essence inlet connection for preventing the flow of mixture from the mixing chamber into the fruit essence delivery tube and container when the mixture delivery valve is closed and pressure builds up in the mixing chamber.

References Cited in the file of this patent

UNITED STATES PATENTS

| | | |
|---|---|---|
| 650,166 | Chadbourn | May 22, 1900 |
| 2,381,589 | Hayes | Apr. 7, 1945 |
| 2,527,927 | Crow, Jr. | Oct. 31, 1950 |
| 2,621,908 | Young et al. | Dec. 16, 1952 |

FOREIGN PATENTS

| | | |
|---|---|---|
| 30,021 | Great Britain | Dec. 24, 1913 |